March 9, 1926.
L. E. SHAW
CONNECTING ROD JIG
1,575,797
Filed June 27, 1922
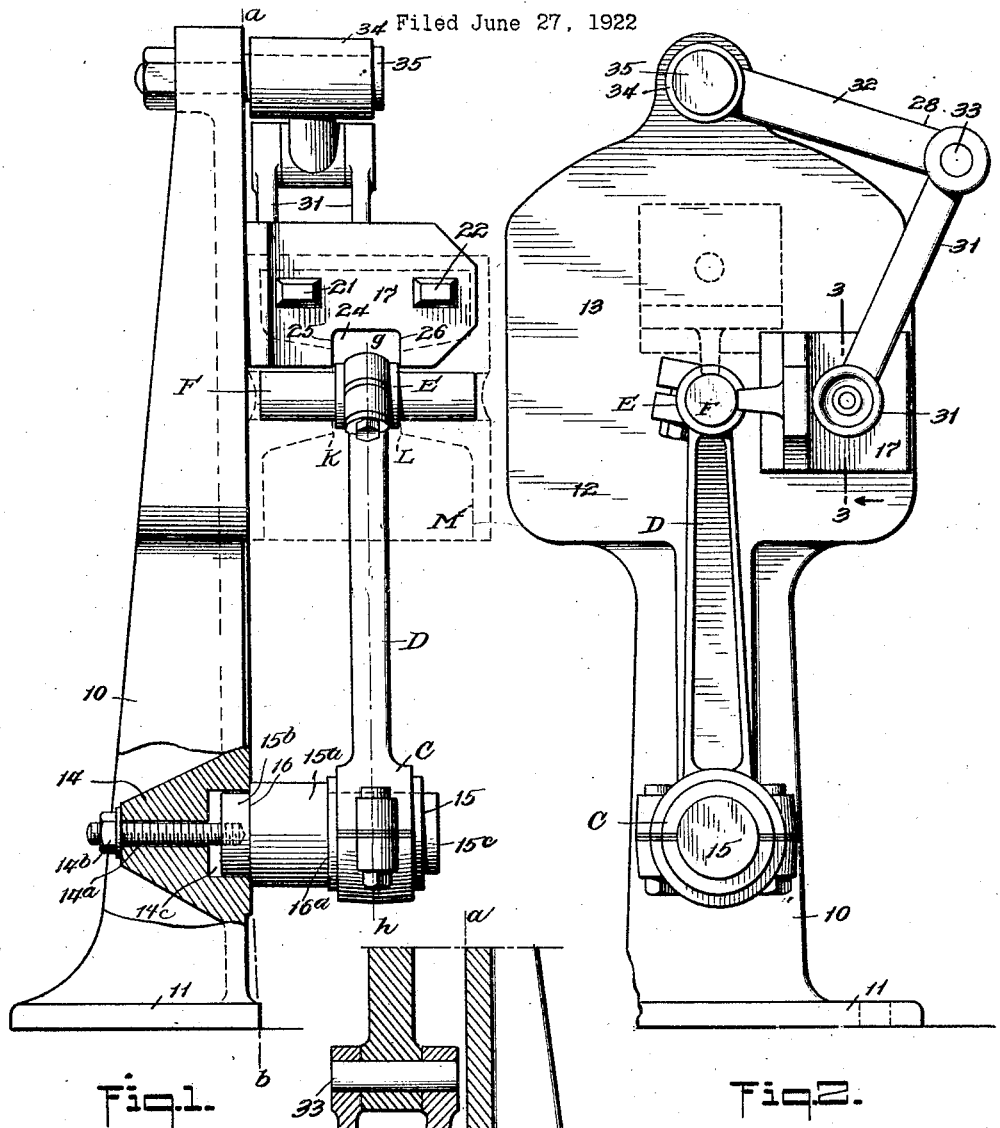
Fig.1.
Fig.2.
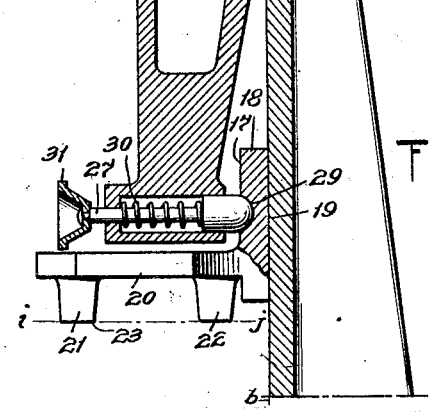
Fig.3.
INVENTOR
Louis E. Shaw
BY
Warren S. Orton.
ATTORNEY Patented Mar. 9, 1926.

1,575,797

UNITED STATES PATENT OFFICE.

LOUIS E. SHAW, OF NEW YORK, N. Y.

CONNECTING-ROD JIG.

Application filed June 27, 1922. Serial No. 571,290.

*To all whom it may concern:*

Be it known that I, LOUIS E. SHAW, a citizen of the United States, and resident of New York city, in the county of New York and State of New York, have invented certain new and useful Improvements in Connecting-Rod Jigs, of which the following is a specification.

The invention relates to a jig or testing instrument for ascertaining the trueness of the several bearing elements of an internal combustion engine connecting rod relative to the position which they should assume when mounted in position in the engine.

Such connecting rods are usually provided with bearings at opposite ends, one of which is identified hereinafter as the crank shaft bearing, and the other as the piston pin bearing in the latter of which is usually positioned a piston pin for connecting the rod with the engine piston. In the mounting of such connecting rods between the piston disposed in the engine cylinder, and the associated crank pin constituting part of the throw of the crank shaft, two refinements of construction are required to insure a nicety of fit between the associated parts. First, the piston pin bearing at one end of the rod must fit between the piston bosses in the piston, and the crank shaft bearing must be centered on the associated crank pin without possibility of any material amount of lateral movement of the rod as a whole during the operation of the engine. Second, it is required that the axes of the bearings be in absolute parallelism, or rather that the axis of the crank shaft bearing be parallel to and in the plane of the axis of the piston pin, when mounted in its proper position in the piston pin bearing.

Accordingly, one of the primary objects of the present invention is to provide a simple form of jig or testing device which can be readily set to test any of the usual sizes of connecting rods which will indicate any slight displacement of the pin bearings relative to each other, and which, at the same time, will indicate any angularity in the bearing surfaces at opposite ends of the connecting rods.

I attain this phase of the invention by establishing a plane of reference at right angles to the desired axes of the bearings in the rod to be tested, and by the use of suitable gages or spacing members, locate the adjacent sides of the bearings relative to each other. As a further refinement of this phase of the invention it is proposed to consider this plane of reference as tangent to the piston to which the rod is to be fitted and then to construct the gages and spacing members from measurements taken directly from the piston bosses in the piston and from measurements taken on the crank shaft.

The invention also features the mounting of the crank shaft bearing on an arbor extending at right angles from this plane of reference and the use of gages which extend perpendicularly from said plane of reference. These gages define a truing line which is arranged to be moved into a plurality of positions circumferentially of the located piston pin so as to test the perpendicularity of the pin surface relative to the plane of reference.

Incidental to this last feature a further object of the invention is to provide a form of gage which can be readily constructed to indicate the desired position of the bearings, which can be manipulated into different positions about the piston pin and which at the same time can be utilized to determine whether the bearing carrying the pin is correctly disposed to fit accurately in the piston.

Still another object of the invention is to provide a device of the class outlined in which the gages and other spacing and measuring parts may be readily substituted for similar parts of different sizes so as to test rods in which the bearings are variously located relative to each other when mounted in operative position in the engine.

Still other objects of the invention are to provide a structure which can be readily machined to provide the desired accuracy of associated parts, which will permit of an easy mounting of the parts to be tested in position and which will permit the operator to have ready access to, and visibility of, the several parts under test.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view in side elevation partially in section of a preferred embodiment of the invention with a connecting rod in position having its piston pin bearing tested, and showing in dotted outlines the position of the piston to be associated with the piston pin under test;

Figure 2 is a view in front elevation of the device shown in Figure 1, showing the gage block in one position testing the piston pin and showing in dotted outline the gage block testing the pin at another point thereof; and Figure 3 is an enlarged detailed transverse sectional view taken on the line 3—3 of Figure 2 looking in the direction indicated by the arrow.

In the following description and in the claims, parts will be identified by specific names for convenience of expression but they are intended to be as generic in their application to similar parts as the art will permit.

In the drawings there is shown a standard 10 having a wide spreading base 11. The upper portion of the standard is enlarged to provide a relatively extensive face plate 12, which is accurately machined on its outer side to provide a flat surface 13, hereinafter referred to as a plane of reference and indicated by the line $a$—$b$ in Figures 1 and 3.

The lower portion of the standard is provided with a boss 14 which extends inwardly from the plane $a$—$b$. The boss is drilled to provide a bolt hole 14$^a$ through which extends a bolt 14$^b$ screwed into one end of an arbor 15. The arbor has a central portion 15$^a$ and reduced end portions 15$^b$ and 15$^c$, one of which, 15$^b$, fits loosely in an enlargement 14$^c$ of the bolt hole. The shoulders 16 and 16$^a$ at opposite ends of the central portion 15$^a$ are accurately machined to extend parallel to each other and at right angles to the axis of the arbor. The shoulder 16 fits against the surface 13 and the central portion 15$^a$ is proportioned so as to constitute an accurately designed spacing member fitted between the front of the standard and the crank shaft bearing C of the connecting rod D to be tested.

The connecting rod D is of conventional structure and is provided at the end opposite the bearing C with a piston pin bearing E in which is mounted the piston pin F. In the form of the rod illustrated it will be assumed for the purpose of this disclosure that it is desired that the bearings C and E be symmetrically disposed relative to the axis of the rod indicated by the line $g$—$h$ on Figure 1. It is of course to be understood that in those cases where other relations are to be maintained between the pin bearings, obvious changes are to be made in the position of the spacing shoulders 16 and 16$^a$ and of the work engaging elements of the gage member hereinafter described.

The gage member or block 17 is substantially L-shaped in cross-section (see Figure 3) with one flange 18 having its outer side 19 machined flat so as to fit against the flat side 13 of the face plate in all operative positions of the gage block. The other flange 20 of the gage block extends perpendicular to the plane of reference or at least extends approximately in a perpendicular direction.

For the purpose of testing the perpendicularity of the side of the piston pin relative to the plane of reference, the flange 20 is provided with two spaced apart aligning lugs 21 and 22, the outer edges or faces 23 of which are disposed in line perpendicular to the surface 13 so as to form a truing line $i$—$j$ perpendicular to the plane of reference $a$—$b$. These aligning lugs are spaced apart a distance to accommodate the bearing E therebetween and are preferably so spaced that they will engage the pin adjacent opposite ends thereof and thus insure accuracy in the establishment of the line $i$—$j$.

For the purpose of determining the proper width of the bearing E and for the purpose of determining the proper location of this bearing considered longitudinally of the pin F, an edge of the flange 20 is provided with a recess 24, the opposite outlining edges 25 and 26 of which are spaced apart the distance set by the opening between the bosses K and L of the piston M.

It is a practical requirement in a device of the class thus described that the gage block be readily and easily shifted from place to place in its testing operation, so as to insure a delicacy of operation in causing the testing surfaces to approach and just touch the part of the pin under test and to attain this manipulation of the gage block without strenuous muscular effort on the part of the operator.

Accordingly the disclosure features a mounting of the gage block so that it will be maintained in firm, but light bearing engagement with the flat surface 13 and at the same time can be readily moved from place to place on the surface. For this purpose the gage block is maintained in bearing engagement with the surface by means of a spring pressed plunger 27 carried by a toggle linkage 28 which supports the gage in yielding relation to the standard. The end of the plunger bearings on the gage block is in the form of a rounded head 29 which fits in a semispherical socket formed in the back of the flange 18. This provides a universal articulation between the plunger and gage block so that the block is maintained in bearing engagement flat against the side of the surface 13 and independent of any inaccuracy of linkage 28 and independent of any tendency of the connection to lift the gage block from the flat surface of the face plate. The plunger 27 is pressed towards the block by a housed spring 30 and is provided at its outer end with a control button 31 so arranged that the plunger can be withdrawn bodily from the gage block when it is desired to substitute a different block for the block illustrated. The linkage includes two links 31 and 32 pivotally connected by a pin 33 and with one of the links 32 connected to the upper end of the standard 10 by a long bearing sleeve 34 rotatably mounted on a bearing pin 35.

In operation it will be understood that the device is set up for the particular rod to be tested. A gage block will be formed with the edges 25 and 26 spaced from the flat side 19 distances corresponding to the distances of the ends K and L from the edge of the piston measured diametrically of the piston and along the axis of the piston pin F. Care will be exercised that in the construction of this gage block the aligning lugs be positioned to engage the piston pin at widely spaced points and will therefore be outside of the projected outlines of the recess 24. The form of arbor 15 will be selected to fit the crank shaft bearing accurately and to provide that length of spacing portion 15ª which will dispose the crank shaft bearing C in its proper position relative to the other parts when assembled on its crank pin.

The connecting rod D to be tested is disposed in position with its bearing C snugly engaging against the shoulder 16ª which thus indicates that the adjacent side of the bearing C is parallel to the plane a—b. By means of a wrench or any other approved adjusting means the rod is twisted or machined into its desired position until the piston pin F extends perpendicular to the plane of reference a—b.

In order to determine whether the piston pin bearing is in its desired position the gage block is shifted to as to bring the opening 24 over the bearing E as shown in Figure 1 and any necessary adjustment of the bearing is made until it snugly fits between the edges 25 and 26 of the opening. This will insure the proper location of the bearing E with reference to the bearing C and will further insure parallelism of the sides or ends of the bearings.

The bearing is then tested to insure the parallelism of the piston pin F relative to the axis of the bearing C. This is attained by swinging the gage block bodily about the axis indicated by the plunger 27 so as to bring the aligning lugs into engagement with the piston pin on opposite sides of the bearing E. While it is only necessary to test the pin in two planes, at right angles to each other as shown in the full and dotted lines of the position of the block in Figure 2, it is preferred to swing the aligning lugs circumferentially about the pin and in this way insure a true fit of the pin when mounted in the piston.

By means of a device of the type outlined it is possible to test rods of different lengths and with different sized bearings, for the flat surface 13 of the face plate may be made as extensive as desired and in practice is made sufficiently extensive to accommodate the standard lengths and sizes of connecting rods used in automobile constructions. As all measurements are referred to the plane of reference, which plane can be accurately located on the engine by setting up a straight edge tangent to the piston or with the usual clearance, and as all measurements can thus be taken from the straight edge and utilized in determining the length of the sleeve 16 and the proper position of the edges 25 and 26 of the gage recess 24, any desired accuracy of fit may be attained.

The gage block can be left in any of its shifted positions while the operator swings the rod about the arbor and clear of the device. When so removed the piston bearing or its pin can be adjusted, scraped or machined and swung back towards the gage thus insuring a repeated testing of the same part with a fixed gage after which the gage block can be shifted into another position and the testing and machining repeated with the gage in the new position.

It is a particular feature of this disclosure that it is possible to test the side faces of both bearings, not only in connection with their spaced relation to the plane of reference and to each other but they can also be tested for their parallelism to this plane and thus for their relative parallelism. In this way any excessive side play of the bearings when mounted in position in the engine is avoided as well as the avoidance of any tendency of the bearings to cause an unequal wearing of the engaging parts.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A device for testing parallelism of the axis of a piston pin at one end of an engine connecting rod with the axis of the crank shaft bearing at the other end, comprising a standard having one side flat to provide a reference plane, an arbor having its axis extending at right angles from said plane and adapted to have the crank shaft bearing of the rod to be tested fitted thereto, and a gauge block engaging said reference plane and movable into a plurality of operable positions thereon, said block provided with means defining a testing line extending perpendicular to said reference plane in all operable positions of the block and in each of the different operative positions of the block adapted to engage different places on the pin carried by the piston pin bearing of the rod to be tested when the piston pin is parallel to the axis of the crank shaft bearing.

2. A device for testing parallelism of the axis of a piston pin at one end of an engine connecting rod with the axis of the crank shaft bearing at the other end, comprising a standard having one side flat to provide a reference plane, means for locating the rod to be tested in position with the axis of one of its bearings fixed in position perpendicular to said plane and shiftable means defining a testing line also perpendicular to said plane, said means adapted, as the means is shifted, to contact with the wrist pin carried by the other bearing of the rod at different places about its periphery.

3. A device for testing parallelism of the axis of a piston pin at one end of an engine connecting rod with the axis of the crank shaft bearing at the other end, comprising a standard having one side flat to provide a reference plane, means for locating the rod to be tested in position with the axis of one of its bearings fixed in position perpendicular to said plane, shiftable means defining a testing line also perpendicular to said plane, said means adapted, as the means is shifted, to contact with the wrist pin carried by the other bearing of the rod at different places about its periphery and mechanism for maintaining said means in bearing engagement with said reference plane.

4. In a device for testing the parallelism of the axis of a piston pin with the axis of the bearing at the opposite end of an engine connecting rod, said device provided with means engaging in the bearing at said opposite end to locate the connecting rod and also provided with a bearing surface perpendicular to the desired axis of the pin to be tested, and movable means adjustable while engaging said surface to contact with the pin at different places circumferentially thereof when the pin is in the desired position with its axis perpendicular to said bearing surface.

5. In a device of the class described, the combination with means providing a fixed plane of reference designed to extend at right angles to the desired axis of a connecting rod piston pin, means for locating the rod with the pin in place and means shiftable into a plurality of positions while in bearing engagement with said plane providing a testing line extending at right angles to said plane and shiftable into positions to engage the pin at a plurality of circumferentially spaced points while in bearing engagement with said plane.

6. In a testing device, the combination of a support having a machined surface providing a reference plane, a movable gage slidable into different operative positions on said surface, means for maintaining the gage in bearing engagement with the surface, said gage provided with means defining a testing line perpendicular to said reference plane.

7. In a testing device, the combination of a support having a machined surface providing a reference plane, a movable gage slidable into different operative positions on said surface, means for maintaining the gage in bearing engagement with the surface, said gage provided with elements for defining a truing line having a fixed relation to said reference plane and said elements adapted to be moved with the gage into definite relation to the work to be tested.

8. In a testing device, the combination of a support having a flat surface providing a reference plane, a gage block slidable on said surface, a plunger bearing on the block to force the same into frictional bearing engagement with said surface and a connecting linkage between the plunger and support.

9. In a testing device, the combination of a support having a flat surface providing a reference plane, a gage block slidable on said surface, a plunger bearing on the block to force the same into frictional bearing engagement with said surface, a connecting linkage between the plunger and support and a yielding connection between the plunger and gage block whereby the block is maintained in engagement with said reference plane irrespective of any tendency of the linkage to separate the gage from said surface.

10. In a device of the class described, the combination of a support having a flat side providing a reference plane, a gage, L-shaped in cross-section, having the outer side of one flange machined flat and in engagement with said flat side of the support, means for maintaining said flat sides in inter-engagement, the other flange of the gage extending at right angles to said reference plane, said other flange provided with work engaging elements.

11. In a device of the class described, the combination of a support having a flat side providing a reference plane, a gage, L-shaped in cross-section, having the outer side of one flange machined flat and in engagement with said flat side of the support, means for maintaining said flat sides in inter-engagement, the other flange of the gage extending at right angles to said reference plane, said other flange provided with a plurality of different sets of work locating elements, said gage being bodily shiftable while engaging said reference plane so as to bring the different sets selectively into operative relation to the work to be tested.

12. In a device of the class described, the combination of a support having a flat side providing a reference plane, a gage, L-shaped in cross-section having the outer side of one flange machined flat and in engagement with said flat side of the support, the other flange of the gage extending at right angles to said reference plane, said other flange provided with piston pin engaging lugs.

13. In a device of the class described, the combination of a support having a flat side providing a reference plane, a gage, L-shaped in cross-section having the outer side of one flange machined flat and in engagement with said flat side of the support, the other flange of the gage extending at right angles to said reference plane, said other flange provided with a recess to accommodate the piston pin bearing of an engine connecting rod.

14. In a device of the class described, the combination of means for locating a connecting rod with a piston pin in the bearing at one end, a manually actuated gage mounted for bodily movement having a work engaging part extending parallel to the axis of the pin and adapted to be moved about a pin to engage the periphery of the pin at a plurality of circumferentially spaced points and means for confining said gage relative to said rod locating means.

15. A device for testing parallelism of the axis of a piston pin at one end of an engine connecting rod with the axis of the crank shaft bearing at the other end, comprising a standard having one side flat to provide a vertically extending reference plane, an arbor carried by said standard having its axis extending at right angles from said plane and adapted to have the crank shaft bearing of the rod to be tested fitted thereto and providing a support for the rod to be tested, said arbor provided with a stop spaced from the reference plane a distance to permit the mounting of the rod with its piston pin in place and said arbor adapted to be engaged by the crank shaft bearing to locate the same and the pin at the opposite end of the rod being free of the reference plane.

16. In a device of the class described, the combination with means providing a plane of reference designed to extend at right angles to the desired axis of a connecting rod piston pin, means for locating the rod with the pin in place and in prefixed relation to said plane of reference and means providing a testing line extending at right angles to said plane and shiftable into positions to engage the pin at a plurality of circumferentially spaced points.

17. In a device for testing the relation of the piston pin in the bearing at one end of an engine connecting rod with the bearing at the opposite end, the combination of a support having a side machined flat to provide a reference plane, means for locating said bearing at the opposite end in a definite spaced relation to said plane, and a movable gage guided by said flat side and provided with means for engaging said piston pin when the pin is in a desired relation to the located bearing at the opposite end of the rod.

18. In a device for testing the relation of the piston pin bearing at one end of an engine connecting rod with the crank bearing at the opposite end, the combination of a support having one side flat to provide a reference plane, means for locating one of the bearings in a definite spaced relation to said plane and a movable gage guided by said flat side and provided with a recess having spaced edges for engaging opposite ends of the other bearing when said bearings are in their desired relation.

19. In a device for testing the relation of the piston pin bearing at one end of an engine connecting rod with the crank bearing at the opposite end, the combination of a support having one side flat to provide a reference plane, means for spacing one of the bearings relative to said plane, and a gage guided by said flat side and provided with means for determining the location and the axial length of the other bearing.

20. A testing jig for testing engine connecting rod bearings, comprising a standard, an arbor mounted in the standard and adapted to fit the bearing in one end of a connecting rod, said standard having a truing side to show when the axis of the piston mounted on the piston pin at the other end of the rod is disposed at a right angle to the crank shaft, said arbor provided with means for locating said first named bearing in spaced relation to the truing side and a gage in bearing engagement with said truing side, movable thereon and having a trial face for engaging the side of the piston pin and testing whether said side and the shaft axis are in a common plane.

21. A testing jig for testing engine connecting rod bearings, comprising a standard, an arbor mounted in the standard and adapted to fit the bearing in one end of a connecting rod, said standard having a truing side to show when the axis of the piston mounted on the piston pin at the other end of the rod is disposed at a right angle to the crank shaft, said arbor provided with means for locating said first named bearing in spaced relation to the truing side, and a gage movable on said truing side and having a trial face for engaging the side of the piston pin and testing whether said side and the shaft axis are in a common plane and for determining whether the piston pin bearing is in a preset relation to the side of the bearing engaged by the locating means on the arbor.

22. In a device of the class described, the combination of a support provided with a flat surface, an arbor extending at right angles from said surface, said arbor provided with a bearing receiving part disposed in preset spaced relation to said flat surface and adapted to receive the bearing at one end of an engine connecting rod and a gage guided on said flat surface for testing whether the bearing at the opposite end of the rod is in the desired preset relation to the bearing on the arbor and means for maintaining the gage in operative relation to said flat surface.

23. In a device for testing the positions of the bearings at opposite ends of an engine connecting rod, the combination of means provided with a flat surface forming a reference plane, an arbor extending at right angles to the plane and adapted to fit one of the bearings, said arbor provided with means for locating said bearing in preset spaced relation to the plane and means secured to the first named means, movable relative to but otherwise independent of the other bearing for determining said spacing of the other bearing from said plane.

Signed at New York city in the county of New York and State of New York, this 15th day of September, A. D., 1921.

LOUIS E. SHAW.